United States Patent Office 3,730,734 Patented May 1, 1973

3,730,734 LIGHT-SENSITIVE PHOTOPOLYMERIZABLE MATERIAL CONTAINING PHOTOCHROMIC MATERIAL

Gerhard Albert Delzenne, 's-Gravenwezel, Belgium, assignor to Gevaert-AGFA N.V., Mortsel, Belgium No Drawing. Filed Mar. 12, 1968, Ser. No. 712,362
Claims priority, application Great Britain, Mar. 13, 1967, 11,703/67
Int. Cl. G03c *1/68*
U.S. Cl. 96—115 R 17 Claims

ABSTRACT OF THE DISCLOSURE

Light sensitive photographic materials are provided comprising a light sensitive layer comprising a photochromic material and a photo-hardening polymeric system. Normally, photochromic materials undergo reversible color change. In the disclosed materials, the color formed upon exposure to actinic light is preserved forming a non-fading image.

This invention relates to a photographic material capable of forming a non fading image in a layer of photochromic material on exposing to actinic light.

The term photochromic material as used hereinafter refers to a compound or composition that changes colour or opacity when exposed to light. On exposure such photochromic compounds or compositions undergo reversible colour changes in such a way that they get coloured under the influence of light of certain wavelengths, whereas on irradiation with other and usually longer wavelengths they show a tendency to revert to the colourless state. Though more slowly, the colour generally also fades away in the dark. Other photochromic substances usually occurring in coloured form are bleached under the influence of actinic light rays, and revert to the original colour when exposed to light of different wavelength or when kept in the dark.

There has been found now a material, wherein the transient colour brought about under the influence of light does not fade and wherein a permanent colour is obtained in the exposed areas.

According to the invention a light-sensitive photographic material is provided, which is capable of forming non fading and non-reversible images on exposure to actinic light, which material comprises a light-sensitive layer or stratum containing a photochromic material and a photo-hardening polymeric system.

The photochromic materials, which may be used ir forming the light-sensitive layer or stratum, belong to a large group of chemical compounds or compositions. A complete survey of these compounds and compositions has been given by Richard Exelby in Chemical Rievews, 65, 247–260 (1965). Among these the spiro compounds constitute a very convenient and most preferable class, especialy the spiropyrans, of which 1',3',3'-trimethyl-6-nitrospiro[2H-1-benzopyran-2,2'-indoline] is a very interesting but non-limiting example.

Polymeric systems, in which photochromic dye structures are chemically bound to or incorporated in the polymer chains constitute a special class of photochromic compounds.

Various classes of photo-hardening polymeric systems can be used, i.a.

The polymers carrying cinnamate substituents e.g. polyvinyl cinnamate,

The polymers carrying coumarin and benzo[b]-thiophene groups,

Polymeric systems comprising reactive groups such as hydroxyl groups, thiol groups, aliphatic or aromatic double bonds, as well as a sufficient quantity of photo-cross-linking groups such as arylazido groups, azidocarbonyl groups, azidosulphonyl groups, quinone diazide groups, and thiadiazole groups. These photo-cross-linking groups are decomposed by actinic light rays and react with the reactive groups of the polymeric material to effect the cross-linking reaction. These photo-hardening polymeric systems have been described in the published Dutch patent applications 65,07630 and 65,07628 both filed June 5, 1965, by Gevaert-Agfa N.V., in the British patent specification 1,074,234, filed July 10, 1964, by Gevaert Photo-Producten N.V., and in the published Dutch patent applications 65,11477, filed Sept. 2, 1965, 66,10999 filed Aug. 4, 1966, 67,02042 filed Feb. 10, 1967, and 67,01552 filed Feb. 1, 1967, all by Gevaert-Agfa N.V.

Many combinations are possible. In the first place photochromic compounds and one or more compounds comprising at least two photo-cross-linking groups can be mixed thoroughly with a polymeric material comprising reactive groups as described above. In the second place photochromic compounds carrying at least two reactive groups can be mixed thoroughly with a polymeric material comprising photo-cross-linking groups. In another combination the polymeric material carrying reactive groups may also carry the photo-cross-linking groups as substituents, or the polymeric system may be composed of a mixture of two polymeric materials one of which is carrying the reactive groups and the other the photo-cross-linking groups. Very interesting is a photochromic system, wherein the photochromic groups are substituted on a polymer of the photo-hardening polymeric system. In the latter case, e.g., a same polymeric material would also bear photochromic groups in addition to reactive groups and photo-cross-linking groups. However, other combinations are possible as well, e.g., the photochromic groups and the reactive groups are present on one polymer, whereas the photo-cross-linking groups are substituted on another polymer.

A very special combination is to use in the above-mentioned systems photochromic compounds or substituents that belong to a class, the compounds of which are bleached on exposure to light of specific wavelengths.

It is also possible to produce polymeric compounds carrying at least 2 photo-cross-linking groups as well as photochromic substituents. When admixed with a polymeric compound bearing reactive groups, this could also constitute a new system of non fading photochromy.

The photochromic material according to the present invention comprises reactive groups and photo-cross-linking groups in addition to photochromic groups. When dissolving this photochromic material in a solvent or in a mixture of solvents, the solution obtained can be coated on a support to form layers of the photochromic material. Suitable supports are i.a. metal sheets, glass, cellulose ester films, polystyrene films, polyester films, paper either or not coated with a covering layer e.g. a baryta layer.

When exposing such a layer uniformly to actinic light or when exposing it through a line original or a screen, the photochromic compound will change colour at the exposed areas. Normally such colour change would fade out, i.e., on exposure usually to light of a longer wavelength, or during storage in the dark, the colour disappears or the original colour is formed back again.

However, this is not so when applying the system according to the present invention. The colour formed upon sufficient exposure is preserved to a large extent. If the exposure was performed through a line original or a screen a non fading image is formed from this line original or screen.

EXAMPLE 1

An amount of 0.5 g. of polyester prepared by polycondensation of 2,2 - bis(4 - hydroxyphenyl)-propane and 5-azido-isophthaloyl chloride, as described in Example 1 of the British patent specification 1,082,195 filed Dec. 1, 1964, by Gevaert Photo-Producten N.V., was dissolved in 10 ml. of a mixture of equal volumes of methylene chloride and dioxan. Subsequently 0.05 g. of the photochromic compound 1′,3′,3′-trimethyl - 6 - nitrospiro[2H - 1 - benzopyran - 2,2′ - indoline] which on exposure assumes, as is commonly known, the merocyanine form instead of the spiroform, was also dissolved therein.

The resulting solution was coated on a poly(ethylene terephthalate) film support in such a way that upon drying a layer with a thickness of 6$\mu$ was obtained. Strips of the thus coated film were exposed for 1 min., 5 min. and 10 min. respectively, through a line original by means of an 80 watt high pressure mercury vapour lamp placed at a distance of 12 cm.

At the exposed areas the colour of the merocyanine form having an absorption maximum at 577 m$\mu$ was already clearly perceptible after 15 sec. After an exposure of 1 min., 5 min., and 10 min. respectively clear reproductions of the line original were obtained.

The exposure to light resulted in an increase of the optical density of the film strips at 577 m$\mu$ and this increase in optical density could be measured spectrophotometrically.

There was also formed a solution of the above mentioned photochromic compound, but this time together with an unhardenable polymer i.e. poly(methylmethacrylate).

The decrease in optical density after irradiation at 577 m$\mu$ was checked spectrophotometrically, whilst the exposed film strips wrere stored in the dark. After 70 h. the following residual permanent optical densities were measured:

| | |
|---|---|
| After 1 min. exposure | 0.06 |
| After 5 min. exposure | 0.21 |
| After 10 min. exposure | 0.29 |

The corresponding residual values for the comparison material comprising poly(methylmethacrylate) as binding agent were as follows:

| | |
|---|---|
| After 1 min. exposure | 0.01 |
| After 5 and 10 min. exposure | 0.05 |

It appeared from these measurements that a light-sensitive material comprising a photo-hardening polymeric system in addition to photochromic compounds is capable of retaining a clear and strong image after a long storage in the dark. However, in a light-sensitive material, wherein the photochromic compounds have been dispersed in a polymeric binder that cannot be cross-linked by the influence of light, the image fades very rapidly in the dark.

EXAMPLE 2

An amount of 0.5 g. of the polyester according to example 1 and 0.05 g. of 1′,3′,3′-trimethyl-6-nitro-spiro-[2H-1-benzopyran-2,2′-indoline] were dissolved in 10 ml. of a mixture of equal volumes of methylene chloride and dioxan. The resulting solution was applied to a baryta-coated paper support (30 g. of baryta per sq. m.), so that upon drying a layer having a thickness of 6$\mu$ was obtained. Subsequently the layer was exposed through a line original by means of a mercury vapour lamp of 80 watt placed at a distance of 6 cm.

After an exposure of 15 sec. a purple image was obtained (colour of the merocyanine form). An exposure of 5 min. resulted in a non fading colour image, the maximum value of which was shifted towards 530 m$\mu$.

If the exposed layer was immersed in methylene chloride, the unexposed and thus unhardened areas were washed away so that there was no danger anymore for fogging of the not cross-linked parts.

EXAMPLE 3

An amount of 0.1 g. of poly(vinyl cinnamate) prepared by esterification of partially hydrolysed poly(vinyl acetate) according to a procedure described by M. Tsuda (Makromol. Chemie, 72, (1964), page 174) was dissolved in 10 ml. of chloroform. Subsequently 0.05 g. of the photochromic compound 1′,3′,3′-trimethyl - 6 - nitrospiro-[2H-1-benzopyran-2,2′-indoline] was also dissolved therein.

The resulting solution was then coated on a poly (ethylene terephthalate) film support. The photochromic layer having a thickness of 6$\mu$ was dried. Strips of the film thus produced were then irradiated for 5 min. by means of a 80 watt high pressure mercury arc placed at a distance of 4.5 cm.

The decrease in optical density after irradiation at 577 m$\mu$ was checked spectrophotometrically. After 115 h. a residual permanent optical density of 0.35 was obtained.

What we claim is:

1. A light-sensitive photographic material which provides an essentailly non-fading and non-reversible image on exposure to actinic light comprising a layer or stratum comprising a photochromic material which changes in color when exposed to actinic light and which normally reverts to its original color when not in the presence of actinic light, and a photo-hardening polymeric system comprising photoreactive groups which will decompose upon exposure to actinic light to provide first reactive groups, said polymeric system including second reactive groups which will react with said first reactive groups formed by exposure to actinic light to effect a cross-linking reaction, thereby providing upon exposure to actinic light a stable, essentially non-fading and non-reversible image.

2. Light-sensitive photographic material according to claim 1, wherein the photochromic material is a spiro compound.

3. Light-sensitive photographic material according to claim 2, wherein the photochromic material is 1′,3′,3′- trimethyl - 6 - nitrospiro[2H - 1 - benzopyran - 2,2′ - indoline].

4. Light-sensitive photographic material according to claim 1, wherein the photo-hardening polymeric system is a polyester prepared by polycondensation of 2,2-bis(4-hydroxyphenyl)-propane and 5-azido-isophthaloyl chloride.

5. Light-sensitive photographic material according to claim 1, wherein the photo-hardening polymeric system is poly(vinyl cinnamate).

6. The light sensitive photographic material according to claim 3 wherein the photo-hardening polymeric system is a polyester prepared by polycondensation of 2,2-bis(4-hydroxyphenyl)-propane and 5-azido-isophthaloyl chloride.

7. The light sensitive photographic material according to claim 1 wherein the photo-hardening polymeric system is poly(vinyl cinnamate).

8. Light-sensitive photographic material of claim 2 wehrein the spiro compound is spiropyran.

9. Light-sensitive photographic material of claim 1 wherein the photoreactive groups which will decompose upon exposure to actinic light are selected from the group consisting of arylazido groups, azidocarbonyl groups, azidosulphonyl groups, quinone diazide groups, and thiadiazole groups; and the second reactive groups are selected from the group consisting of hydroxyl groups, thiol groups, and aliphatic or aromatic double bonds.

10. Light-sensitive material of claim 1 wherein the photochromic material is bonded to the photo-hardening polymeric system.

11. A process for the formation of an essentially non-fading and non-reversible photographic image which comprises the steps of (1) providing a photographic element having a layer of stratum comprising a photochromic material which changes in color when exposed to actinic light and which normally reverts to its original color when removed from the presence of actinic light, and a photo-hardening polymeric system comprising photoreactive groups which decompose upon exposure to actinic light to provide first reactive groups, and said polymeric system having second reactive groups which will react with said first reactive groups to effect a cross-linking reaction; and (2) exposing said photographic element to actinic light to effect said cross-linking reaction and to irreversibly change the color of said photochromic material, thereby providing an essentailly non-fading and non-reversible photographic image.

12. The process of claim 11 wherein said photoreactive groups which decompose upon exopsure to actinic light are selected from the group consisting of arylazido groups, azidocarbonyl groups, azidosulphonyl groups, quinone diazide groups, and thiadiazole groups; and the second reactive groups are selected from the group consisting of hydroxyl groups, thiol groups, and aliphatic or aromatic double bonds.

13. The process of claim 11 wherein the photochromic material is a spiro compound.

14. The process of claim 13 wherein the spiro compound is a spiropyran.

15. The process of claim 11 wherein the photochromic material is 1', 3', 3'-trimethyl - 6 - nitrospiro[2H - 1-benzopyran-2,2'-indoline].

16. The process according to claim 11 wherein the photo-hardening polymeric system is a polyester prepared by polycondensation of 2,2-bis (4-hydroxyphenyl)-propane and 5-azido-isophthaloyl chloride.

17. The process of claim 11 wherein the photochromic material is bonded to the photo-hardening polymeric system.

References Cited

UNITED STATES PATENTS

| | | | |
|---|---|---|---|
| 3,212,898 | 12/1965 | Cerreta | 96—88 X |
| 3,278,305 | 12/1966 | Laridon et al. | 96—115 X |
| 3,455,689 | 7/1969 | Laridon et al. | 96—115 X |
| 3,477,850 | 11/1969 | Berman | 96—90 PC |
| 3,482,973 | 12/1969 | Amidon et al. | 96—90 PC |
| 3,370,026 | 2/1968 | Patella | 96—90 PC |

NORMAN G. TORCHIN, Primary Examiner

U.S. Cl. X.R.

96—90 PC, 115 P